United States Patent [19]

Hashima et al.

[11] Patent Number: 5,143,797
[45] Date of Patent: Sep. 1, 1992

[54] MAGNETO-OPTIC RECORDING MEDIUM

[75] Inventors: Kazuo Hashima; Kazuhiko Tsutsumi; Hiroshi Sugahara, all of Amagasaki, Japan

[73] Assignee: Mitsubishi Denki Kabushiki Kaisha, Japan

[21] Appl. No.: 394,012

[22] Filed: Aug. 15, 1989

[30] Foreign Application Priority Data

Aug. 30, 1988 [JP] Japan .................. 63-217128

[51] Int. Cl.$^5$ .................. G11B 11/10; G11B 7/24
[52] U.S. Cl. .................. 428/694; 369/288
[58] Field of Search .................. 369/13, 288, 284, 286; 365/122; 360/135, 114, 59; 428/692, 694, 900

[56] References Cited

U.S. PATENT DOCUMENTS

| | | | |
|---|---|---|---|
| 4,569,881 | 2/1986 | Freese | 369/13 |
| 4,675,767 | 6/1987 | Osato | 360/131 |
| 4,737,408 | 4/1988 | Kuwahara | 428/900 |
| 4,792,474 | 12/1988 | Murakami | 428/64 |
| 4,800,112 | 1/1989 | Kano | 428/692 |
| 4,801,499 | 1/1989 | Aoyama | 428/694 |
| 4,849,304 | 7/1989 | Uchiyama | 428/704 |
| 4,897,320 | 1/1990 | Nomura | 369/13 |

FOREIGN PATENT DOCUMENTS

| | | | |
|---|---|---|---|
| 0291848 | 11/1988 | Fed. Rep. of Germany | 369/284 |
| 0066549 | 4/1982 | Japan | 369/13 |
| 0052442 | 3/1984 | Japan | 369/13 |
| 0171055 | 2/1985 | Japan | 369/13 |
| 0179952 | 9/1985 | Japan | 369/284 |
| 1202353 | 9/1986 | Japan | 428/694 |
| 0195532 | 9/1986 | United Kingdom | 369/284 |

OTHER PUBLICATIONS

U.S. patent application, Ser. No. 132,011 filed Dec. 14, 1987.
U.S. patent application, Ser. No. 155,728 filed Feb. 16, 1988.
U.S. patent application, Ser. No. 196,556 filed May 20, 1988.
Topical Meeting on Optical Data Storage, Tech. Digest, Oct. 15–17, 1985 TUAA3-1, "Magneto-Optic Erasable Disc Memory with Two Optical Heads", Taira et al.
IEEE Transactions on Magnetics, vol. Mag 20, No. 5, Sep. 1984; "Erasable Magneto-Optical Recording Media"; Hartman, et al.
Topical Meeting on Optical Data Storage, Tech. Digest, Apr. 18–20, 1984 ThC–C1-1; "Digital Magneto-Optic Disk Drive" Deguchi, et al.

Primary Examiner—John W. Shepperd
Assistant Examiner—Mike Kessell
Attorney, Agent, or Firm—Wolf, Greenfield & Sacks

[57] ABSTRACT

A magneto-optical recording medium comprises a dielectric film disposed on a substrate and formed, for example, of silicon nitride, of for example, 65 nm thickness, a magnetic film disposed on the dielectric film, and formed, for example, of, rare earth-transistion metal alloy thin film, of, for example, 35 thickness, and a reflective film disposed on the magnetic film, and formed of titanium nitride, by, for example, sputtering.

15 Claims, 1 Drawing Sheet

MAGNETO-OPTIC RECORDING MEDIUM

BACKGROUND OF THE INVENTION

The present invention relates to a magneto-optic recording medium capable of erasing, recording, and reproducing information by means, for example, of a laser beam.

Magneto-optic recording media are been actively studied as a candidate for rewritable optical recording media, and rare earth-transition metal alloy thin films are widely used as a magnetic film thereof. Rare earth-transition metal alloy thin films however have insufficient magneto-optic effect (Kerr effect, for example) and playback signals obtained do not have sufficient carrier-to-noise (C/N) ratio.

As a measure to compensate for the insufficient magneto-optical effect to give rotation of the plane of the polarized light, use of a reflective film was suggested, as, for example, in Japanese Patent Application Kokai Publication No. 194,664/1986.

FIG. 2 shows a prior-art magneto-optical recording medium. As illustrated, it comprises a substrate 1, a dielectric film 21, a magnetic film (recording layer) 3 formed of a rare earth-transition metal alloy thin film, another dielectric film 22, and a reflective film 4. Part of the laser beam L incident on the magnetic film 3 is reflected at the surface of the magnetic film 3 and is subjected to Kerr rotation. The magnetic film 3 is sufficiently thin so that part of the laser beam L incident on the magnetic film 3 is transmitted through the magnetic film 3 and is reflected at the surface of the reflective film 4, and then is transmitted through the magnetic film 3 again. During the transmission, the laser beam L is subjected to Faraday rotation. As a result, the Kerr rotation given upon the reflection at the surface of the magnetic film 3 and the Faraday rotation given upon transmission through the magnetic film 3 are added to each other. In other words, apparent Kerr rotation is increased.

Moreover, by appropriately choosing the refraction index and the thickness of the dielectric film 22, the repeated reflection in the dielectric film 22 can be utilized to increase the apparent Kerr rotation further. The reflective film 4 must have a sufficient reflectivity, and is formed of Al, Au, Ag and the like.

But with the prior-art magneto-optical recording medium described above, although the apparent Kerr rotation is increased, because the dielectric film 22 acts as an anti-reflection film, the reflectivity is decreased, and because of the thermal conductivity of the dielectric film 3, the writing sensitivity is not sufficient. This is because the high thermal conductivity acts to rapidly diffuse heat generated by the local heating by irradiation with the laser beam for the purpose of recording information.

To eliminate this problem it was suggested to form the magnetic film 3 directly on the reflective film 4 of Al, Au, Ag or the like. But because of the high thermal conductivity of the reflective film 4, the writing sensitivity is lowered.

SUMMARY OF THE INVENTION

An object of the invention is to provide an optical recording medium having a high writing sensitivity and a high carrier-to-noise (C/N) ratio in the playback signals.

Another object of the invention is to provide an optical recording medium which is inexpensive.

A magneto-optic recording medium according to the invention comprises a substrate, a dielectric film formed on the substrate, a magnetic film formed on the dielectric film, and a reflective film formed on the magnetic film, the reflective film being formed of titanium nitride.

The titanium nitride used as the reflective film has a low thermal conductivity so that the writing sensitivity can be improved. Moreover, the titanium nitride has a high reflectivity so that the desired Faraday effect is fully utilized and the carrier-to-noise ratio in the reading is improved.

DETAILED DESCRIPTION OF THE EMBODIMENTS

Figure 1:
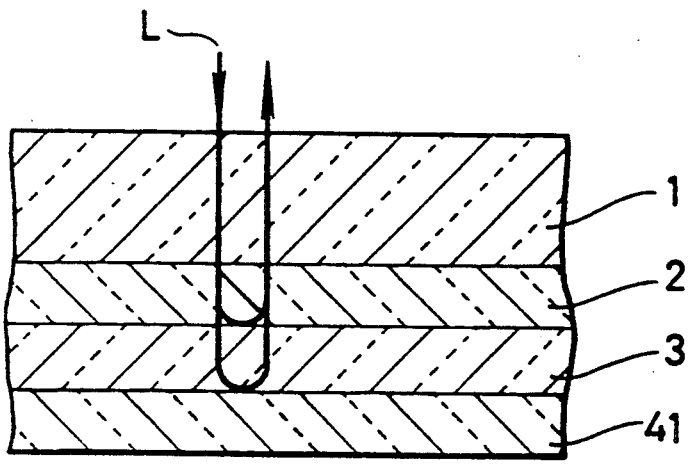
FIG. 1 is a sectional view showing a magneto-optic recording medium of an embodiment of the invention.

As illustrated in FIG. 1, the magneto-optic recording medium according to the invention comprises a substrate 1, a dielectric film 2 disposed on the substrate 1, a magnetic film 3, which serves as a recording layer, and disposed on the dielectric film 2, and a reflective film 41 disposed on the magnetic film 3, and formed of titanium nitride.

The substrate 1, the dielectric film 2, and the magnetic film 3 are transparent to laser beam L used for writing information in and reading information from the magnetic film 3.

For example, the dielectric film 2 is formed of silicon nitride, and is about 65 nm thick.

For example, the magnetic film 3 is formed of a rare earth-transition metal alloy thin film, and is about 35 nm thick.

The reflective film 41 is formed for example, by sputtering. The laser beam is incident on the side of the substrate 1. During reading, part of the laser beam is reflected at the surface of the magnetic film and by virtue of the Kerr effect, the plane of polarized light (laser beam) is rotated if one of the information "1" or "0" is recorded. The magnetic film 3 is thin enough so that part of the laser beam L is transmitted through the magnetic film and is reflected at the surface of the reflective film. By virtue of the Faraday effect, the plane of polarized light is rotated or not depending on whether "1" or "0" is written.

Because the Kerr rotation and the Faraday rotation are both utilized and added to each other, the rotation of plane of polarized light is enlarged and the C/N ratio is improved over when only the Kerr effect is utilized. Because the thermal conductivity of the reflective layer is low, the recording sensitivity is improved.

A specific embodiment of the invention will now be described.

EMBODIMENT

On a transparent substrate 1 of polycarbonate, a transparent dielectric film 2 of silicon nitride and having a thickness of 65 nm is formed, and then a magnetic film 3 of rare earth-transition metal alloy of TbFeCo and having a thickness of 35 nm is formed thereon, and then a reflective film 41 of titanium nitride and having thickness of 100 nm is formed by sputtering. A magneto-optic information recording medium of this embodiment, as shown in FIG. 1, is thus obtained.

COMPARATIVE EXAMPLE

Figure 2:
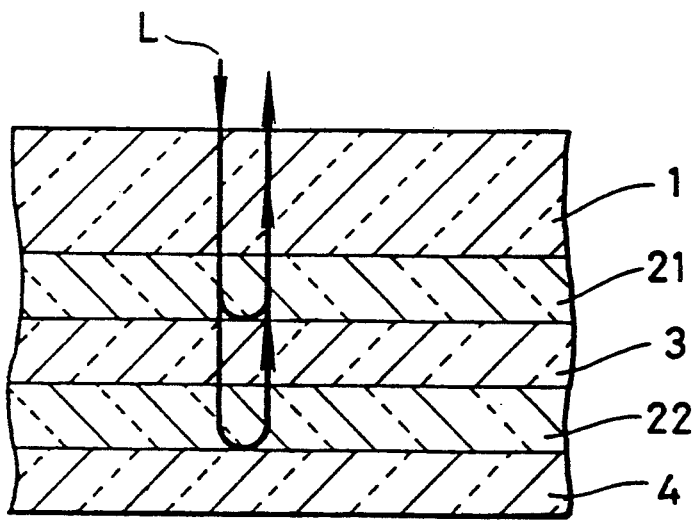
FIG. 2 is a sectional view showing a magneto-optic recording medium in the prior art.

On a transparent substrate 1 of polycarbonate, a transparent dielectric film 21 of silicon nitride and having a thickness of 65 nm is formed, and then a magnetic film 3 of TbFeCo and having a thickness of 35 nm is formed thereon, and then another dielectric film 22 of silicon nitride and having a thickness of 40 nm is formed thereon, and then a reflective film 40 of Al and having a thickness of 100 nm is formed. A magneto-optic information recording medium of this comparative example, as shown in FIG. 2, is thus obtained.

Table 1 belows shows the reflectivity and the recording and playback characteristics of the above Embodiment and the above Comparative Example. The conditions under which the the characteristics were measured were as follows:
Line speed: 5.6 m/sec.
Recording frequency: 1 MHz
Playback power: 1.5 mW

TABLE 1

|  | Reflectivity (%) | C/N ratio (dB) | Recording Power minimizing the secondary distortion (mW) |
| --- | --- | --- | --- |
| Embodiment | 11.1 | 56.5 | 5.9 |
| Comparative Example | 8.5 | 54.8 | 6.5 |

Table 1 shows that the reflectivity of the Embodiment of the invention is about 30% higher than that of the Comparative Example, and the carrier-to-noise ratio of the playback signals is higher by about 2 dB.

Because of the improved reflectivity, the dielectric film (the film 22 in FIG. 2) inserted between the magnetic film 3 and the reflective film 4 in the prior art can be eliminated, and yet a sufficient effect of rotation of the plane of polarized light can be obtained.

Because titanium nitride used as the reflective film has a lower thermal conductivity, the recording sensitivity is improved by about 10%.

In the embodiment of the invention described above, the substrate 1 is formed of polycarbonate, but it may alternatively be formed of glass, polymethylacrylate, epoxy, photopolymer, or the like. The dielectric film 2 may alternatively be aluminum nitride, Si-Al-O-N, or silicon nitride. In the embodiment described above, the rare earth-transition metal alloy thin film is formed of a single layer of TbFeCo, but it may alternatively be formed of TbFe, GdTbFe, GdTbFeCo, DyTbFe, DyTbFeCo, TbCo, GdTbCo, NdDyFeCo, NdTbFeCo, GdDyFeCo, or the like, or of a bi-layer configuration.

What is claimed is:
1. A magneto-optic recording medium comprising:
a substrate;
a dielectric film disposed on said substrate;
a magnetic film disposed on said dielectric film; and
a reflective film disposed on and in direct engagement with said magnetic film, on the side thereof opposite to said substrate, and formed of titanium nitride; and
whereby said reflective film reflects light transmitted through said magnetic film and has a low thermal conductivity adjacent said magnetic film.

2. A medium according to claim 1, wherein said substrate, said dielectric film, and said magnetic film are transparent to a laser beam used for writing information in and reading information from said magnetic film.

3. A medium according to claim 1, wherein said dielectric film is formed of silicon nitride.

4. A medium according to claim 1, wherein said dielectric film is about 65 nm thick.

5. A medium according to claim 1, wherein said magnetic film is formed of a rare earth-transition metal alloy thin film.

6. A medium according to claim 1, wherein said magnetic film is about 35 nm thick.

7. A medium according to claim 1, wherein said reflective film is formed by sputtering.

8. A magneto-optic recording medium comprising:
a substrate transparent to wavelengths of light emitted by a laser beam used for writing information onto and reading information out of said medium;
a dielectric film disposed on said substrate and transparent to said wavelengths of light;
a magnetic film disposed on said dielectric film, at least partially transparent to said wavelengths of light, and for storing information in the form of regions of differing magnetization; and
a reflective film disposed on and in direct engagement with said magnetic film on the side thereof opposite to said substrate,
said reflective film for reflecting light transmitted through said magnetic film and formed of titanium nitride,
whereby said reflective film also has a low thermal conductivity adjacent said magnetic film.

9. A magneto optical recording medium as set forth in claim 1 without an additional dielectric film disposed on the same side of the magnetic film as said reflective film.

10. A medium according to claim 9 wherein said dielectric film is formed of silicon nitride.

11. A medium according to claim 9 wherein said dielectric film is about 65 nm thick.

12. A medium according to claim 9 wherein said magnetic film is formed of a thin film of an alloy of at least one rare earth and at least one transition metal.

13. A medium according to claim 9 wherein said magnetic film is about 35 nm thick.

14. A medium according to claim 9 wherein said reflective film is formed by sputtering.

15. A magneto optical recording medium as set forth in claim 9 without an additional dielectric film disposed on the same side of the magnetic film as said reflective film.

* * * * *

UNITED STATES PATENT AND TRADEMARK OFFICE
CERTIFICATE OF CORRECTION

PATENT NO. : 5,143,797
DATED : September 1, 1992
INVENTOR(S) : Hashima et al.

It is certified that error appears in the above-identified patent and that said Letters Patent is hereby corrected as shown below:

Column 4,

In claim 10, line 1, please change "claim 9" to --claim 8--.

In claim 11, line 1, please change "claim 9" to --claim 8--.

In claim 12, line 1, please change "claim 9" to --claim 8--.

In claim 13, line 1, please change "claim 9" to --claim 8--.

In claim 14, line 1, please change "claim 9" to --claim 8--.

Signed and Sealed this

Eighth Day of February, 1994

Attest:

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,143,797
DATED : September 1, 1992
INVENTOR(S) : Hashima et al.

It is certified that error appears in the above-indentified patent and that said Letters Patent is hereby corrected as shown below:

Column 4,

In claim 9, line 2, please change "claim 1 to --claim 8--.

In claim 15, line 2, please change "claim 9" to --claim 1--.

Signed and Sealed this

Fourth Day of April, 1995

Attest:

BRUCE LEHMAN

Attesting Officer

Commissioner of Patents and Trademarks